(12) United States Patent
McGowan (10) Patent No.: US 8,139,072 B2
(45) Date of Patent: Mar. 20, 2012

(54) NETWORK HARDWARE GRAPHICS ADAPTER COMPRESSION

(76) Inventor: Scott James McGowan, Redmond, WA (US)

( * ) Notice: Subject to any disclaimer, the term of this patent is extended or adjusted under 35 U.S.C. 154(b) by 772 days.

(21) Appl. No.: 12/102,735

(22) Filed: Apr. 14, 2008

(65) Prior Publication Data

US 2008/0204465 A1    Aug. 28, 2008

(51) Int. Cl.
*G06F 13/372* (2006.01)
*G06F 13/00* (2006.01)
*G09G 5/36* (2006.01)
(52) U.S. Cl. .................. 345/534; 345/536; 345/559
(58) Field of Classification Search .............. 345/501, 345/519, 530, 531, 534, 536, 545, 558, 559, 345/565; 709/217, 218; 725/105, 109, 118
See application file for complete search history.

(56) References Cited

U.S. PATENT DOCUMENTS

| | | | |
|---|---|---|---|
| 4,542,903 A | 9/1985 | Yokoi et al. | |
| 4,562,402 A | 12/1985 | Irvin | |
| 4,740,779 A | 4/1988 | Cleary et al. | |
| 4,760,388 A | 7/1988 | Tatsumi et al. | |
| 4,761,641 A | 8/1988 | Schreiber | |
| 4,891,633 A | 1/1990 | Imazeki et al. | |
| 5,047,754 A | 9/1991 | Akatsuka et al. | |
| 5,227,863 A | 7/1993 | Bilbrey et al. | |
| 5,275,565 A | 1/1994 | Moncrief | |
| 5,530,483 A * | 6/1996 | Cooper et al. | 348/518 |
| 5,949,437 A | 9/1999 | Clark | |
| 5,956,046 A | 9/1999 | Kehlet et al. | |
| 5,963,192 A * | 10/1999 | Wong et al. | 345/593 |
| 5,963,200 A | 10/1999 | Deering et al. | |
| 5,991,313 A | 11/1999 | Tanaka et al. | |

(Continued)

FOREIGN PATENT DOCUMENTS

WO    01/97022 A2    12/2001

OTHER PUBLICATIONS

"Multi-user Linux turns one computer into ten," URL=http://www.desktoplinux.com/news/NS4893747360.html, dated Oct. 20, 2008, 1 page.

(Continued)

*Primary Examiner* — Joni Hsu
(74) *Attorney, Agent, or Firm* — Seed IP Law Group PLLC (57) ABSTRACT

A Video Card with standard video output and a Network Ethernet port output of compressed digital video output that represents the image seen by a monitored computer user. A custom video card software driver is used to set up the dual display video controller configurations that assist with the functioning of the digital video compression that is a hardware combination of Run-Length, Huffman encoding and MPEG located on the same monitored user video card. One of the video controller's I²C ports is used to control the compression video circuits and as the pathway for the custom Ethernet communications, thus avoiding an additional costly connection to the user's main computer bus. The first video stream from the dual head video controller chip is used for regular viewing by the local PC (personal computer) user. The second video flow is a frame delayed version of the first video stream used to for comparing current and old frames as the core digital compression image process that results in an Network Ethernet video output. This invention provides a low cost hardware compression for the popular XGA, UXGA VESA computer graphics formats.

2 Claims, 11 Drawing Sheets

Ethernet Video Input-Output Card Circuitry Configuration

U.S. PATENT DOCUMENTS

| | | | |
|---|---|---|---|
| 6,052,555 | A | 4/2000 | Ferguson |
| 6,101,478 | A | 8/2000 | Brown |
| 6,208,761 | B1 | 3/2001 | Passaggio et al. |
| 6,232,932 | B1 | 5/2001 | Thorner |
| 6,262,695 | B1 | 7/2001 | McGowan |
| 6,337,881 | B1 | 1/2002 | Chaddha |
| 6,381,659 | B2 * | 4/2002 | Proch et al. ............ 710/57 |
| 6,392,705 | B1 | 5/2002 | Chaddha |
| 6,535,208 | B1 | 3/2003 | Saltchev et al. |
| 6,601,173 | B1 | 7/2003 | Mohler |
| 6,690,337 | B1 | 2/2004 | Mayer, III et al. |
| 6,714,172 | B2 | 3/2004 | Matsuzaki et al. |
| 6,718,415 | B1 | 4/2004 | Chu |
| 6,765,543 | B1 | 7/2004 | Masuda et al. |
| 6,784,881 | B2 | 8/2004 | Wasserman et al. |
| 6,804,724 | B2 | 10/2004 | Shin |
| 6,816,129 | B1 | 11/2004 | Zimmerman |
| 6,839,061 | B1 | 1/2005 | Kamakura et al. |
| 6,847,335 | B1 | 1/2005 | Chang et al. |
| 6,912,695 | B2 | 6/2005 | Ernst et al. |
| 7,008,324 | B1 | 3/2006 | Johnson et al. |
| 7,030,835 | B2 | 4/2006 | Krempl |
| 7,051,356 | B2 * | 5/2006 | Weinstein ............ 725/105 |
| 7,071,990 | B2 | 7/2006 | Kondo |
| 7,091,926 | B2 | 8/2006 | Kulas |
| 7,170,468 | B2 | 1/2007 | Knopf |
| 7,233,336 | B2 | 6/2007 | Mondal |
| 2001/0050659 | A1 | 12/2001 | Sato et al. |
| 2002/0030635 | A1 | 3/2002 | McGowan |
| 2003/0110217 | A1 | 6/2003 | Raju |
| 2005/0093768 | A1 | 5/2005 | Devos et al. |
| 2007/0005693 | A1 | 1/2007 | Sampath et al. |
| 2007/0050766 | A1 | 3/2007 | Pomerantz |
| 2007/0097016 | A1 | 5/2007 | McGowan |
| 2007/0106959 | A1 | 5/2007 | McGowan |
| 2007/0109216 | A1 | 5/2007 | McGowan |
| 2009/0013056 | A1 * | 1/2009 | Weinstock et al. ........ 709/208 |

OTHER PUBLICATIONS

MagicTwin SFF Barebone System, URL=http://www.warp2search.net/contentteller/news_story/magictwina_sff_barebone_system.html, dated Jan. 8, 2004, 4 pages.

Cartwright, David, "Operating Systems and Servers Reviews—Adderlink IP Review: Extend the Reach of Your KVM Switches by Connecting Them Over an IP Network," Techworld, URL=http://www.techworld.com/opsys/reviews/index.cfm?reviewID=191&pagtype=samechap..., dated Jul. 16, 2004, 2 pages.

Jetway Computer Inc., MiniQ 435TWIN, MagicTwin SFF Barebone System, Technology on the Move, Specification Sheet, Feb. 2004, 2 pages.

Active Hardware, Review of the Virtual PC Buddy B-210, URL=http://active-hardware.com/english/reviews/div/b210.htm, dated Dec. 21, 2000, 4 pages.

I2C Interface Support in Windows, Windows Hardware Developer Central, URL=http://www.microsoff.com/whdc/archive/i2c.mspx, dated Dec. 4, 2001, 3 pages.

Xilinx, The Design of a Video Capture Board Using the Spartan Series, URL=http://www.xilinx.com, dated Mar. 31, 1999, 7 pages.

Real VNC, Windows VNC Viewer, URL=http://www.realvnc.com/winvncviewer.html, download date Sep. 1, 2003, 6 pages.

Adderlink IP User Guide, dated Jun. 2004, 64 pages.

* cited by examiner

**Figure 1 Ethernet Video Input-Output Card,
Block Diagram of User Installation**

**Figure 2 Ethernet Video Input-Output Card
Image Memory and Scan rates**

**Figure 3 Ethernet Video Input-Output Card
Circuitry Configuration**

Figure 4
Low CostDual Head Video Controller,
Designed for LCD Panel Display, with Video Memory Used as
Image Processor for User Monitoring

**Figure 5
Method of Compressing**
Imagery Common to User Computer Terminals and Personal Computers. Image Compressed by Loss-Less Run-length and Hufman Methods in Text areas Step 1 Screen is transmitted with common Run-Length loss-less Compression.
Then the screen Image is tested for changes from last image in limited number of blocks of 3 to 10 percent of the screen each.
(Computer screens are characterized by lack of change, except for small areas)

Figure 6
Low Cost Dual Head Video Controller
Used with Video Driver
to Flip Flop Image Components to Assit Compression

Figure 7
Color Key used to subtract zone of high rate change
Dual Output Video Contoller set up to provide Comparison Image to Compressor, to subtract Area of High Motion Figure 8
Blitter-Stretch Engine Used
to Reduce Data Flow
and Camera Port Feedback Figure 9
Network Input Data Port for Viewing Network Video
Entering Low Cost Video Controller Via Camera-Input-Port

Fig 10    Low Cost Hardware Video Compression

Fig 11
Phase Locked Frame Timing and Memory Map of Low Cost Hardware Video Compression Fig 12   Low Cost Hardware Video Compression
for 16 Independant Network Displays

NETWORK HARDWARE GRAPHICS ADAPTER COMPRESSION

The Network Ethernet Graphic Adapter Hardware Video Compression is a video card with standard video output and an Ethernet port compressed digital video output. A custom video card software driver is used to set up the dual display configurations that assist with the functioning of the digital video compression required for the Network Ethernet video output port. One of the I2C ports of the video controller chip is used to both control the video circuits external of the video controller and as the pathway for the custom Ethernet communications control. The first video flow from the dual head video controller chip is used for regular viewing by the local PC (personal computer) user and acts as the current video frame. The second video flow from the dual head video controller chip is used as the old frame, whereas the current frame and old frame can them be compared real time in an FPGA as the core function of the video compression process. And whereas both video streams from the one video controller are vertical sync phase locked. The current frame is loaded back into the video controller (to become the old frame) with a 32 pixel clock delay via the zoom video input port, on top of the same address block as the old frame, thus arriving 32 clocks temporally later in time, on the address's that had just been read out. This method is referred to as MGAC "McGowan Graphic Adapter Compression". Usefulness of this invention is to fill the need for persons telecommuting (working from home on a computer that is network linked to the employer), monitoring corporate computers and controlled persons, monitoring of computerized equipments, whereas most viewing of XGA, UXGA VESA type display adaptor screens is done via software image compression. That software compression is taxing on computer usefulness and slow in response to screen changes. Typical standalone XGA, UXGA VESA type display compression hardware is expensive. This invention provides a low cost hardware compression.

A large number of screens of computer imagery can be maintained in the single video card memory. This can then become up to 16 compressed distinct data flows. This is done by using the on-board general purpose micro processor interrupts, from vertical sync, in the dual head video controller to step through a series of new address's to be loaded as the start-address for each of the two scan engines and the zoom-video-input port start address. As the processor counts vertical syncs, this informs when it is time to step to the next video stream to be transmitted again, and stored again, thus performing the real time frame comparison process. This method is referred to as MGACM "McGowan Graphic Adapter Compression Multi"

The natural benefit of this customized video display flow from the second video flow channel of the video controller chip, is that it dramatically reduces the video compression task cost of the product, with no significant loss of color depth data. The original video controller IC manufacturer's intent for the second scan engine video flow is for a typical user display. However the second video flow in this case is used to output a flow that is always a duplicate image of the first video flow, and that is reduced in color palette (8,8,8 RGB is reloaded as RGB) and can also be reduced in frame rate. By sending the compressed video out from the video card as a hardware task, rather than as a software task, the computational and memory load on the local PC to compress video is typically reduced by more than an order of magnitude, or to nearly zero, sparing that local PC computation for its intended purpose of general use.

The Network Ethernet video flow is used for absolute image monitoring Internet usage of a computer user and other purposes such as cost reduced, long distance remote control of computers that act as servers. The Ethernet port on the video card can also act as the general high speed Ethernet port of the local users computer. Additional benefits of the second customized video flow is that is can be re-created without a mouse pointer. The mouse pointer is then recreated for the compressed video flow via information from the software video driver on the user PC in combination with the I$^2$C connected video hardware an the digital processor located in that video hardware.

A novel use of the video controller chip's dedicated camera-input-port is instead used for the purpose of receiving digital Ethernet input port data. The data has fake vertical and horizontal sync pulses added to it, so the camera port can accept the data and place that data in a known location in video memory. This Ethernet input method better facilitates the movement of large volumes of data, and thus provides a method of Ethernet input to the local PC that is typically more efficient than most dedicated personal computer Ethernet ports in terms of uses of interrupts, CPU instructions and main-bus time consumption.

A further novel use of the camera-input-port of the video controller is done in this design when a second copy of the Network Ethernet Video I-O card (Network Video Graphics Adapter Compressor) is used at the viewing station. The second Ethernet Video I-O card, place in the monitoring PC, receives the large volume of input Ethernet data from the local PC that represents the display screen of the local PC. The camera-input-port on the video controller is then used to bring in the image that has been fully restored in the electronic circuits external of the video controller. Thus virtually no computational load is required by the monitoring PC.

A further novel use of a video controller IC is to use function such as double buffering to a output video scan engine to assist with a complex video compression method mix. In this invention, the dual head video controller assisting the double buffer process for pixel comparisons from frame to frame is combined with a mix of classic compression lossy techniques is referred to as MGACC "McGowan Graphic Adapter Compression Complex". Whereas long term (10 second to 2 minutes as a background function) study of the screen data is done in smaller and smaller block areas, to zero in on rectangular screen portions that are most appropriate for lossy-YUV-motion type compression (AKA MPEG style). Whereas the rest of the screen area being served with a RGB-loss-less combination of run-length and Huffman encoding. Other functions of the Video Controller that are used for novel automated compression assistance is image double buffering to a scan engine and using a scan engine to create a video flow color key. Yet another novel use is multiple video scan engines that are phase locked so subtractive image calculations (seeking pixel variations from old frame to current frame) can occur in an external compression engine.

BACKGROUND OF THE INVENTION

The present invention relates to the use of video controller chips to make more useful Internet Surfing Monitoring. The video controller integrated circuit, normally intended to just product images for a personal laptop computers. In this invention such a chip is used in either a laptop of a desktop personal computer and is specifically configured with special circuits to create an outgoing Ethernet data flow of a copy of the image the local user is seeing on their display. This invention reduces the cost, as no external video to Ethernet converter is required.

Also, the invention does this task better than external devices that do such tasks via an analog to digital conversion of video signals, to supply signal to the digital video compression circuit. Analog to digital conversions are not only costly, they inherently introduce variations in the data that are not correct and increase compression work load. This invention uses the parallel digital video bus of the video controller chip that was intended for the flat panel display of a laptop personal computer, as the source for the compression circuits. Such video controllers chips are typically dual display in nature and already have video software drivers that set the video controller up a manner to have duplicate images on the flat panel display and the second channel display, making them exceptionally useful at this unintended task. Further, this method of combining a dual head video controller with a FPGA allows for multiple channels (representing multiple displays) of compressed video network feed from the single video board. Typically these multiple channels take advantage of transmitting update frames at speeds in the range of 20 Hz to 24 Hz, that more closely match the needs to LCD panels and human motion vision temporal considerations. In some cases the frame rate is made even slower if the network has less bandwidth available.

The difficult technical requirements for a user to overcome internet monitoring make the Ethernet Video I-O card (Network Video Graphics Adapter Compressor) well qualified for use in A) government facilities where security issues are critical, B) in prisons where internet usage can help educate inmates in job skills, however have extreme risk if not monitored C) for children that require monitoring, by parents or assignees that likely work from the monitored person and D) in business settings where employee's require monitoring.

DESCRIPTION OF THE PRIOR ART

Prior art typically used external devices to do such tasks via an analog to digital conversion of video signals, to supply signal to the digital video compression circuit. Analog to digital conversions are costly in terms of transistor counts and power consumption, they inherently introduce variations in the data that are not correct. Prior art has also used RGB to YUV color conversions to reduce video data, which produce considerable undesired artifacts to the RGB end viewer. Prior art typically uses a dedicated video frame buffer to hold a frame for comparison, thus significantly increasing cost of the computer video compression product.

Other types of prior art based on software video compression are inherently easy for the internet user to fake a digital image source into, thus defeating the monitoring function. Prior art does not use a dual head video controller to assist the frame to frame comparison process. This invention's novel art has the user's pure-exact video data stream act as the source video to assist in the complex automated manners that modern video controller IC's excel in to assist in video compression such as blitting, stretching, dual output data flow and camera inputs used for network video input. Whereas prior art of software video compression suffers from missing area's of video information where complex video hardware functions may be called by the users' operating system such as hardware mouse pointer, direct draw games, direct draw movie plays and hardware application windows.

Another type of prior art for use of a built into processor into a video controller for repetitious effect of the imagery, typically for the movement of sprites and image overlay areas has been done in the past in common gaming equipments, with program code for such being called a "display list". The use of the processor in this invention to update the start-image address registers for the purpose of making multiple data streams for multiple displays is novel.

SUMMARY OF THE INVENTION

The invention reduces cost of purchase and maintenance to achieve Multiple Internet Surfing Stations. The system makes use of common video controller chips to achieve not multiple displays and to multiplex those video controls I²C communication ports to achieve more ports for keyboards and mice for the additional Internet Surfing Stations. Modified (customized) versions of Internet Surfing Browsers are needed for the additional stations to function. The system runs on common multi-tasking operating systems, but does not elevate the functional status of these systems to multi-user systems.

DESCRIPTION OF THE PREFERRED EMBODIMENTS

The invention embodies expanded intended use of Laptop PC or desktop PC video controller chip to achieve an Ethernet output compressed image 302, copy of the user image function by use of the parallel port of the laptop video IC 100, 300, 1000, 1200 for the compression (frame to frame pixel comparison) circuits 301, 1001, 1201. Also that the external circuits of the video controller are communicated to by the video driver through the low cost method of the I2C 303 port of the video controller chip, thus avoiding an additional expensive connection to the PC mother board. Also that the software video driver can take an active role in further improvements to segregate the mouse pointer from video compression, and to send the mouse position separately. Also that the camera input data port 900 of the video controller on the monitoring station is used for Ethernet video data with fake vertical and horizontal pulses as an efficient manner to input Ethernet data 901 to a PC. Also that the zoom camera input data port of the video controller is used for image data input at a monitoring station to further reduce work load on that PC station.

Figure 10:
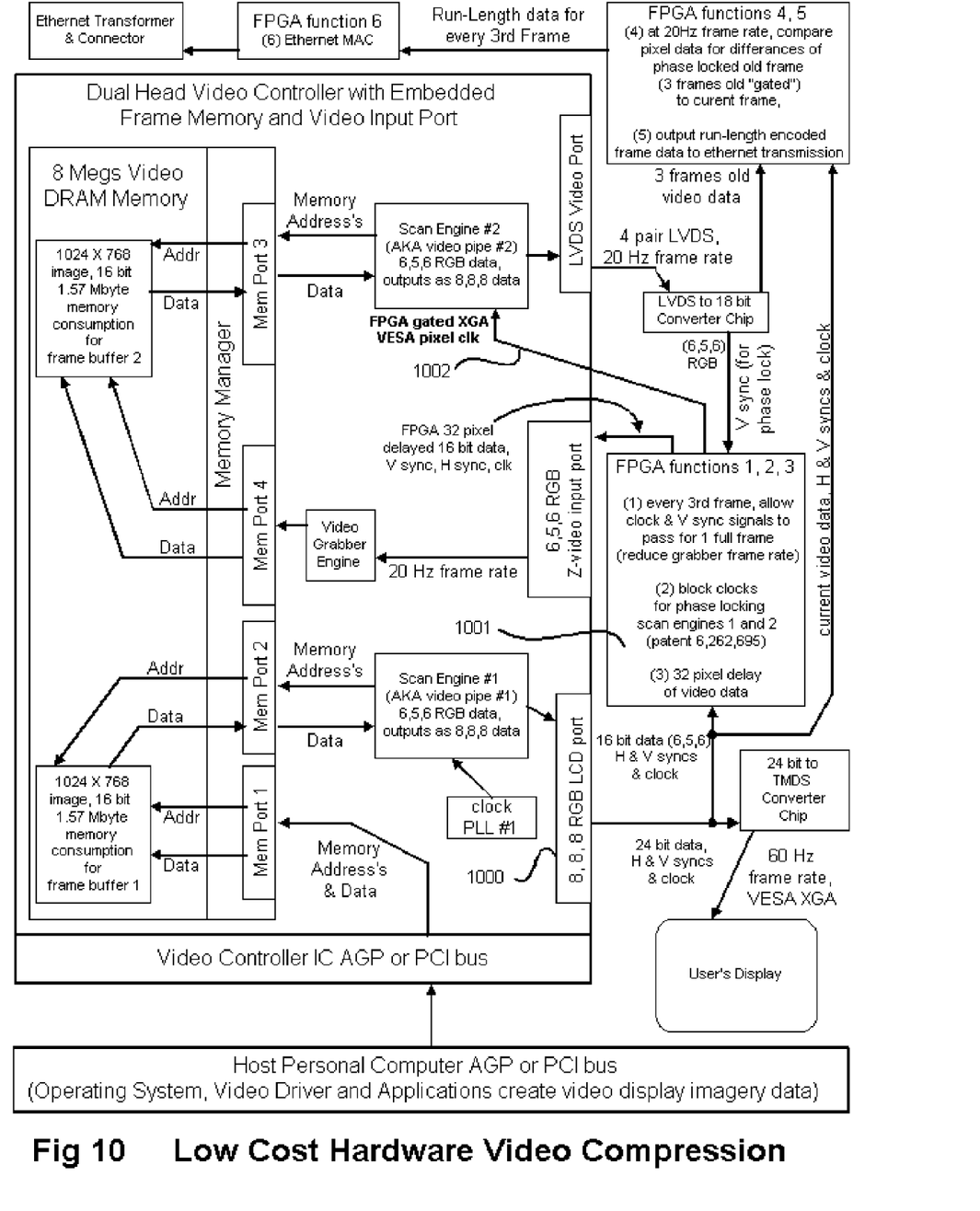
FIG. 10 Low Cost Hardware Video Compression, shows a 32 pixel delay required to stall Current Frame being written into video memory, with slight temporal delay behind Old Frame being read from same memory. This drawing also shows the use of the 8,8,8 RGB port typically used for a LCD panel as the source of the 5,6,5 RGB data for the zoom video input port, and the FPGA pixel comparison process.
Figure 12:
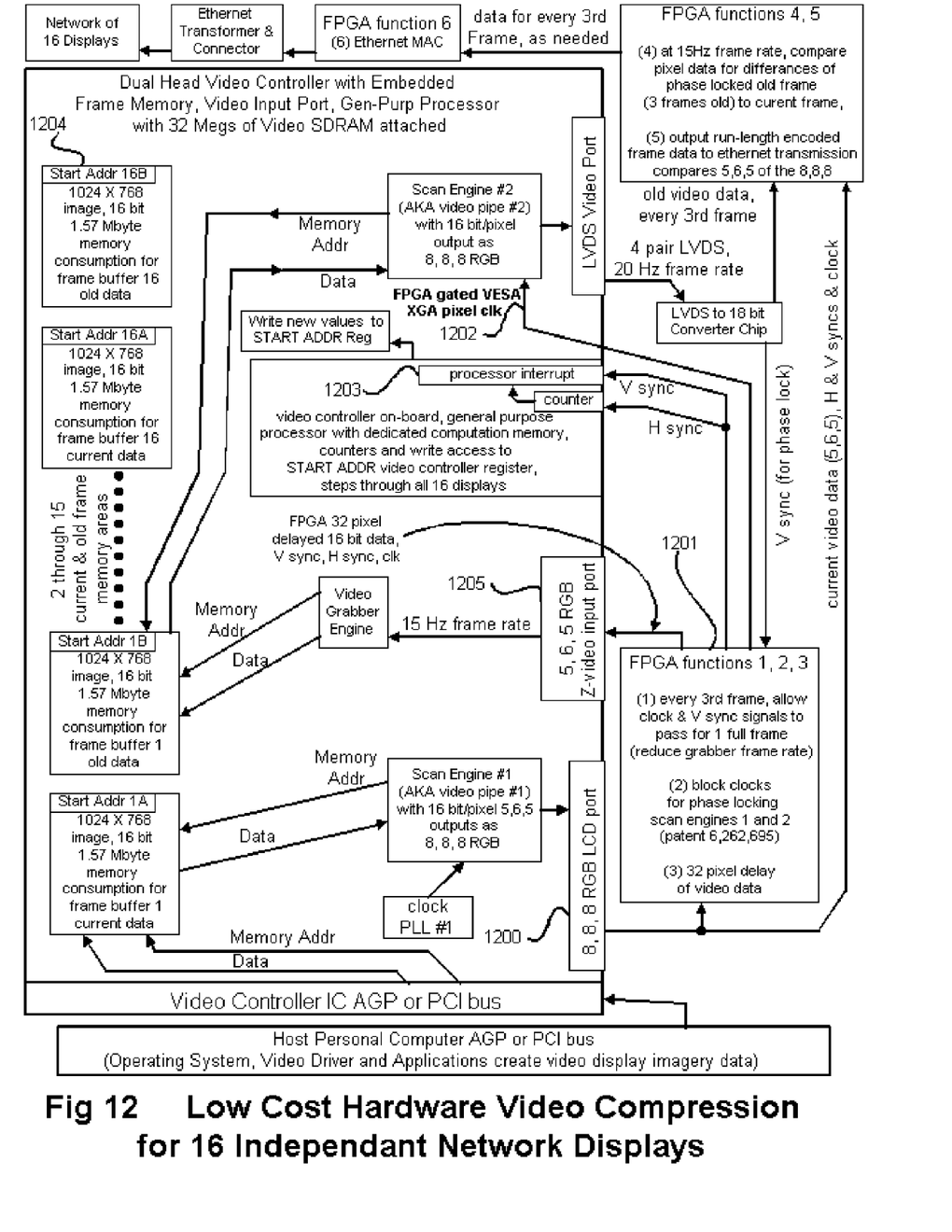
FIG. 12 Low Cost Hardware Video Compression for 16 Independent Network Displays, shows a 32 pixel delay, and use of 8,8,8 data to 5,6,5 as in FIG. 10 and in addition uses the video controller's general purpose microprocessor interrupt 1203 (common in video controller's but often unused in typical video cards) used to load new START-ADDR (start address of video frame) 1204 for both scan engines, to create up to 16 distinct different display image feeds.

A preferred embodiment, is to use the U.S. Pat. No. 6,262, 695 clock subtraction method to subtract pixel clocks 1002, 1202 to the slave scan engines to bring them into vertical sync phase lock. If not U.S. Pat. No. 6,262,695 video scan engine phase lock method, other common methods of higher cost such as the scan engine address counters may allow each flip flop of said counter to be re-settable. The low cost, core concept of using a dual head video controller with a input 1205 zoom data port to achieve the function of frame buffering so old and new frames can be compared real-time (at the FPGA 1001, 1201) requires the video streams be vertical sync phase locked.

Figure 11:
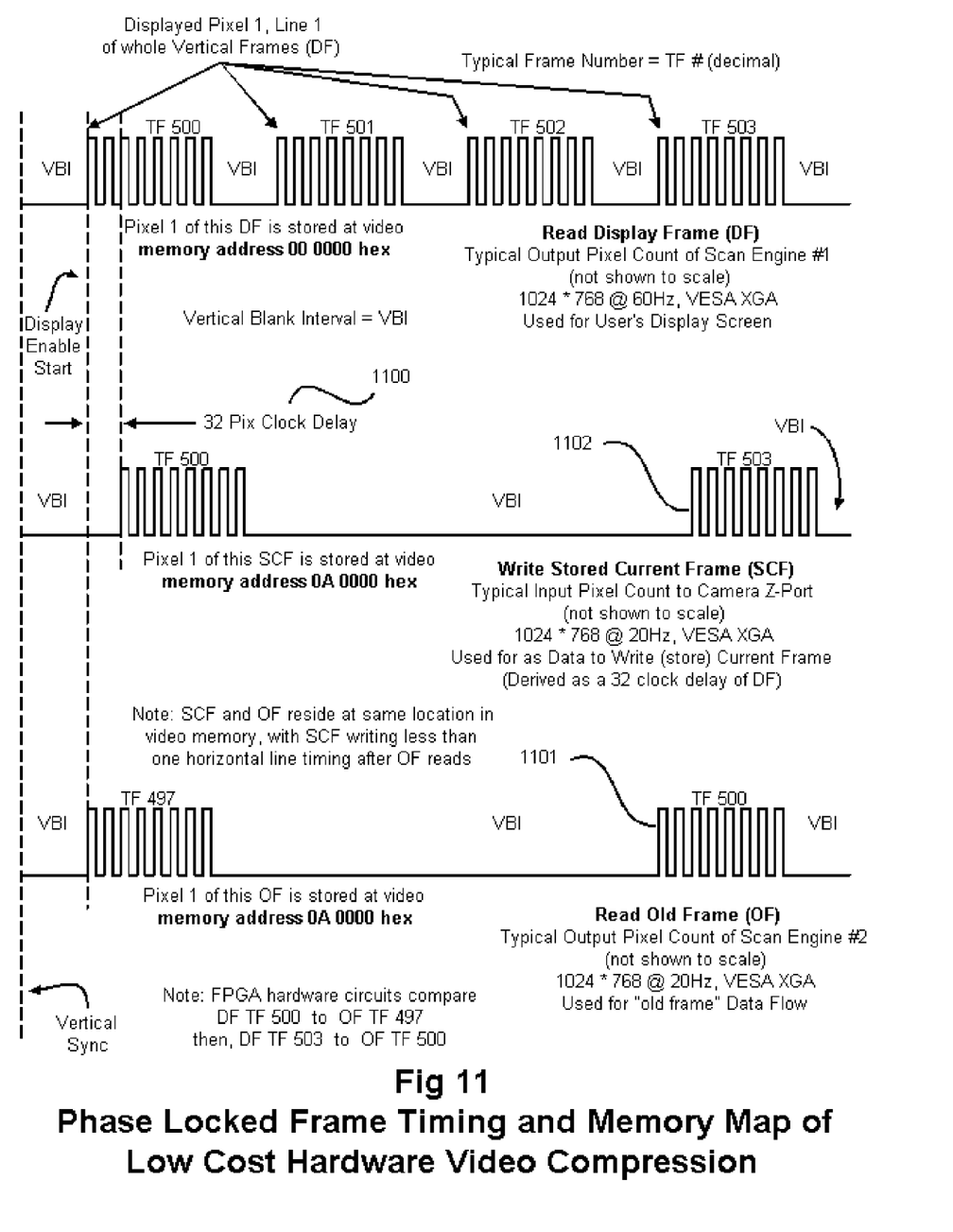
FIG. 11 Phase Locked Timing and Memory Map of Low Cost Hardware Video Compression, shows standard VESA timed frames with large vertical blank intervals and shows two skipped frames between Current Frame and Old Frame for compression comparison function, whereas scan engine 1, scan engine 2 and the zoom video port are vertical sync phase locked.

A preferred embodiment is to FIFO delay the current frame video data (from "A" frame buffer memory location) via a FIFO that is built into the FPGA 32 pixel clocks 1100 (16 bits wide, 32 clocks deep) such that the delayed stream is then feed back into the zoom video input port (aka zoom camera input port) to get stored in video memory into the "B" frame buffer memory location, just after "B" frame buffer memory location has read out the pixel locations 1101, just barely in advance of the current frame being loaded from the zoom port 1102.

Figure 1:
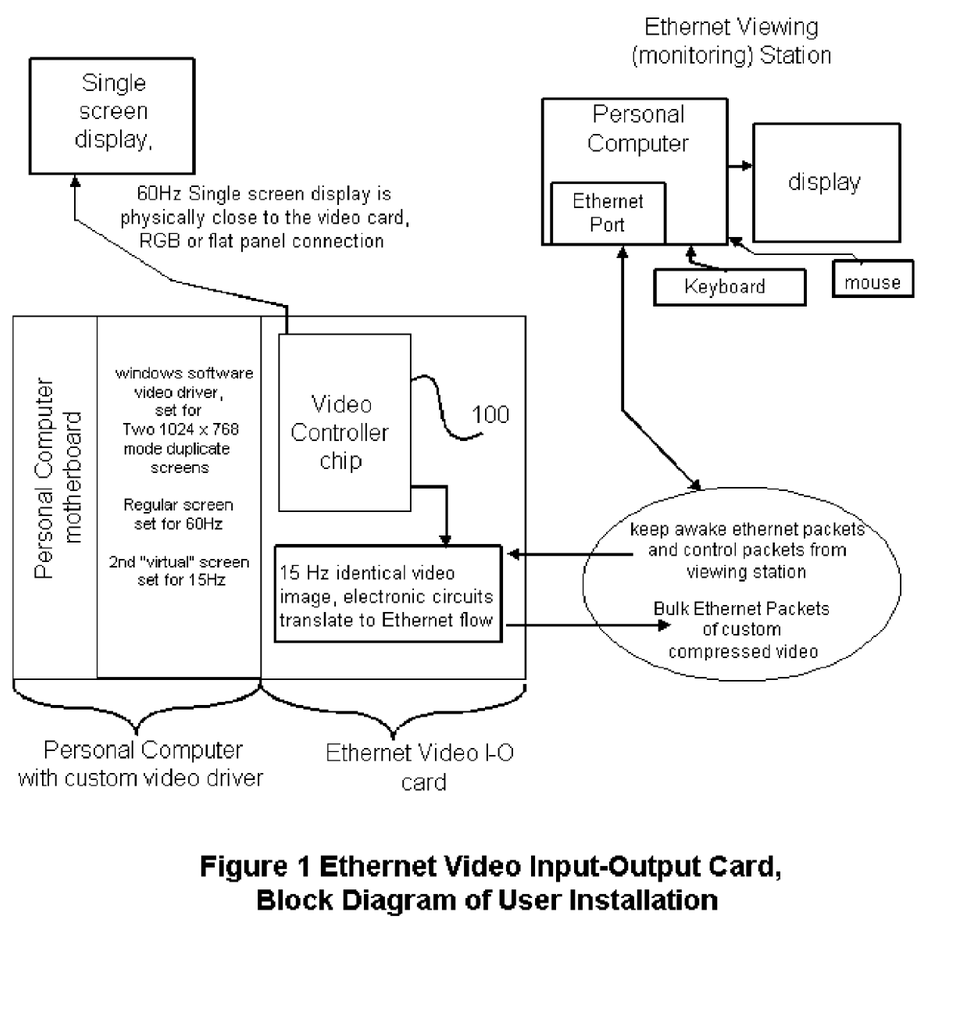
FIG. 1 Ethernet Video Input-Output Card Block Diagram of User Installation, shows how the card is sued in a multiple PC network, whereas one station can monitor the user display of another station.
Figure 2:
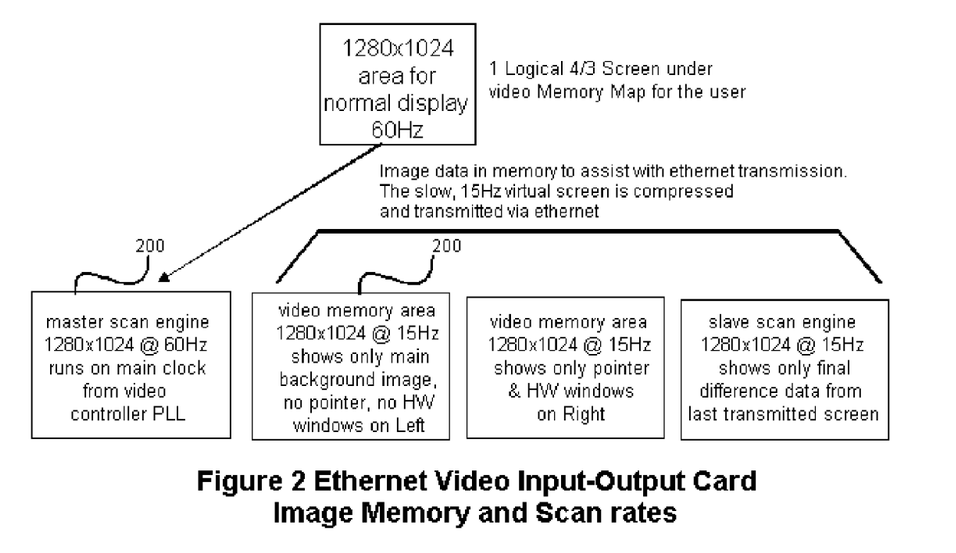
FIG. 2 Ethernet Video Input-Output Card Image and Memory Scan Rates, shows how typical resolutions and scan rates are view by the internet user versus how the other video channel of duplicate image runs at a lower 15 Hz scan rate.
Figure 3:
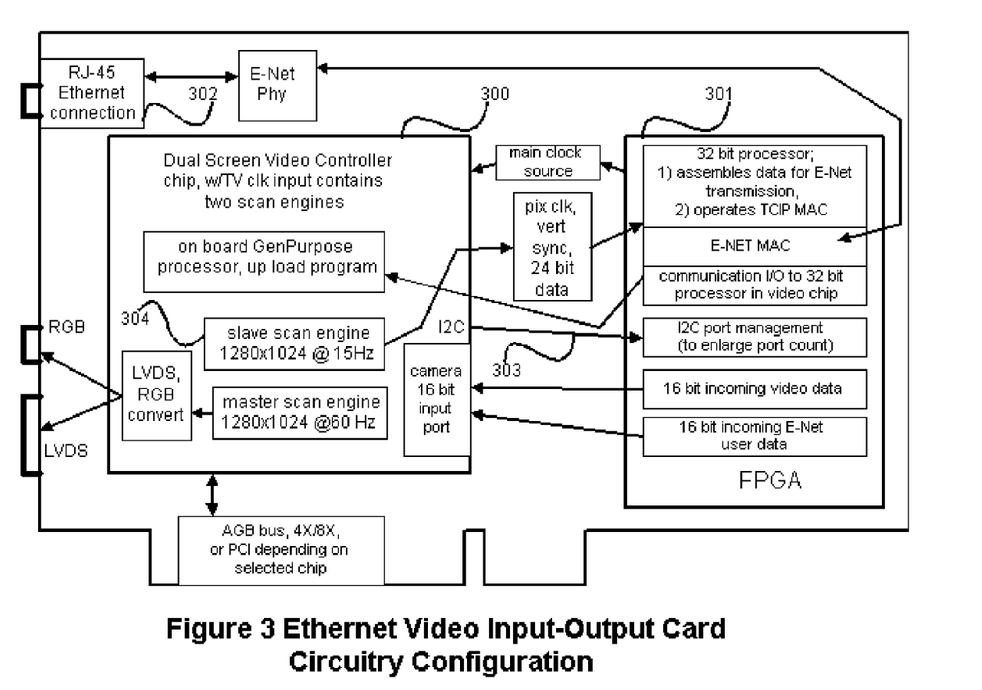
FIG. 3 Ethernet Video Input-Output Card Circuitry Configuration shows how a video controller chip is mated with external circuits such as a FPGA (field programmable gate array) to it's I²C port and camera input port to achieve the Ethernet output compressed image, copy of the user image function.
Figure 4:
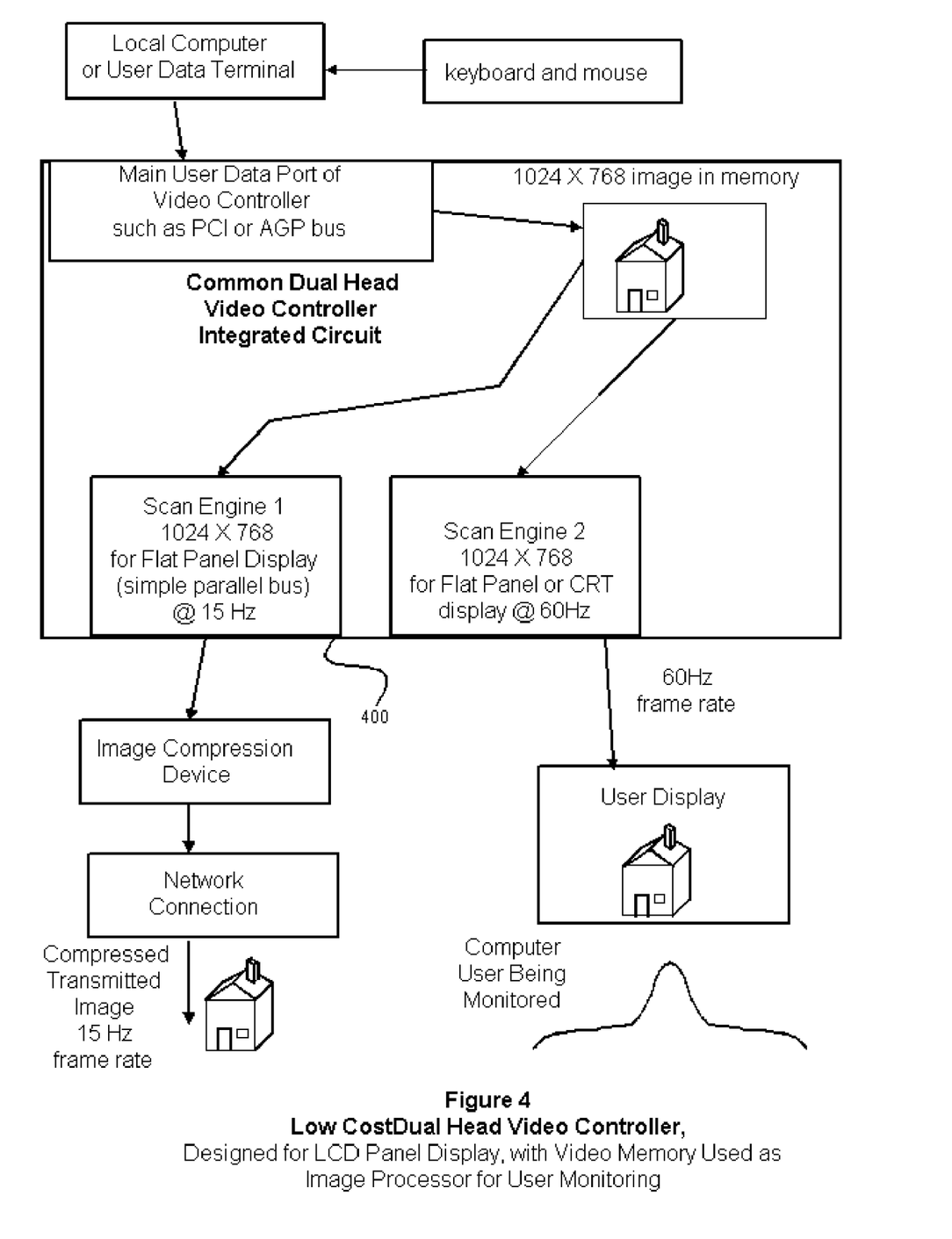
FIG. 4 Low Cost Dual Head Video Controller, novel use for duplicate image compression usage block diagram, shows how the same image in memory is scanned by both scan engines in the video controller, but at different scan rates.
Figure 5:
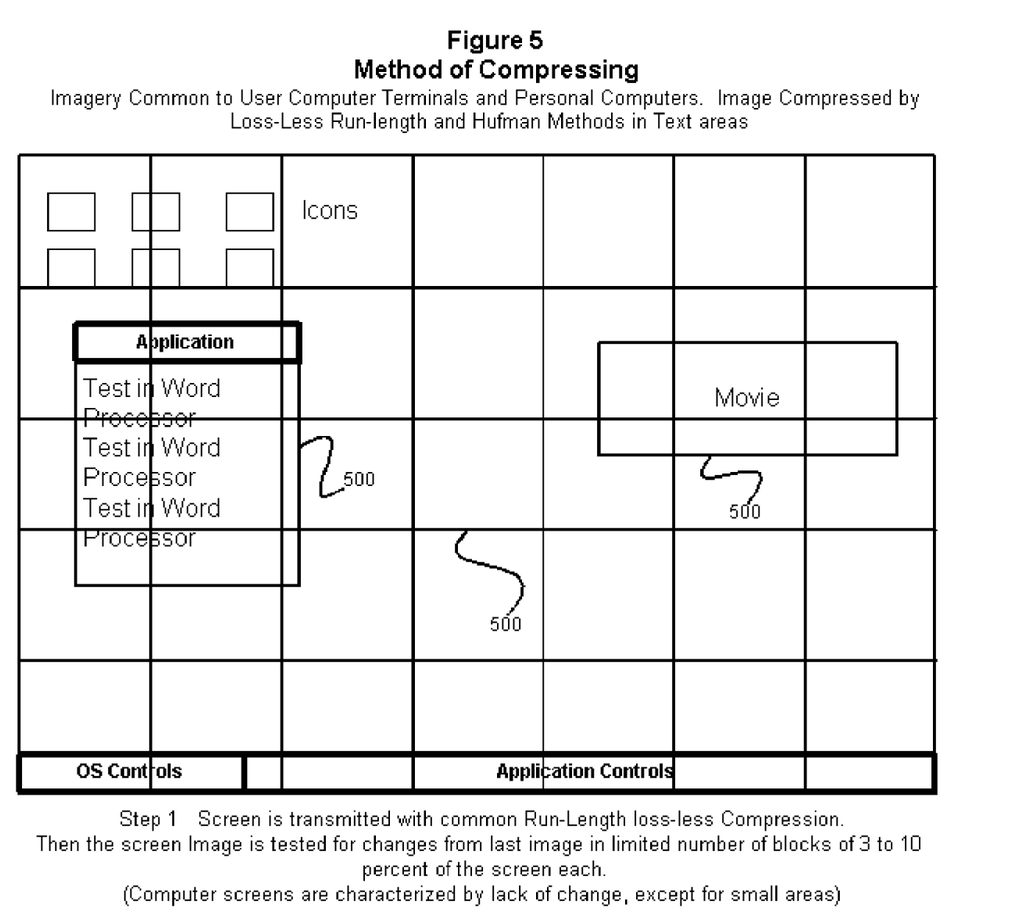
FIG. 5 Method of Compressing, shows imagery common to user computer terminals and personal computers. Image compressed by loss-less Run-length and Huffman methods in text areas.
Figure 6:
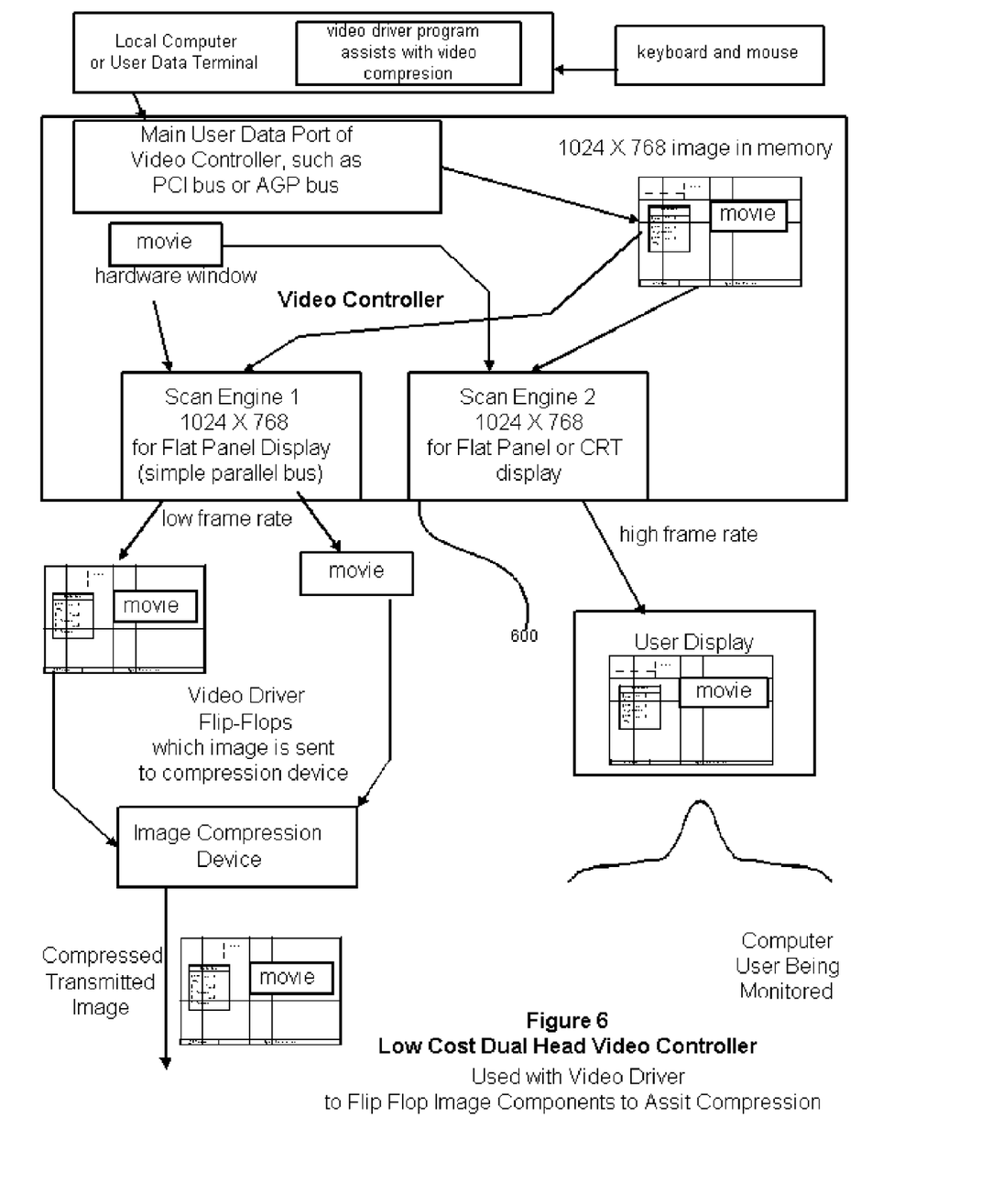
FIG. 6 Low Cost Dual Head Video Controller used with software video driver to flip flop image components to assist compression.
Figure 7:
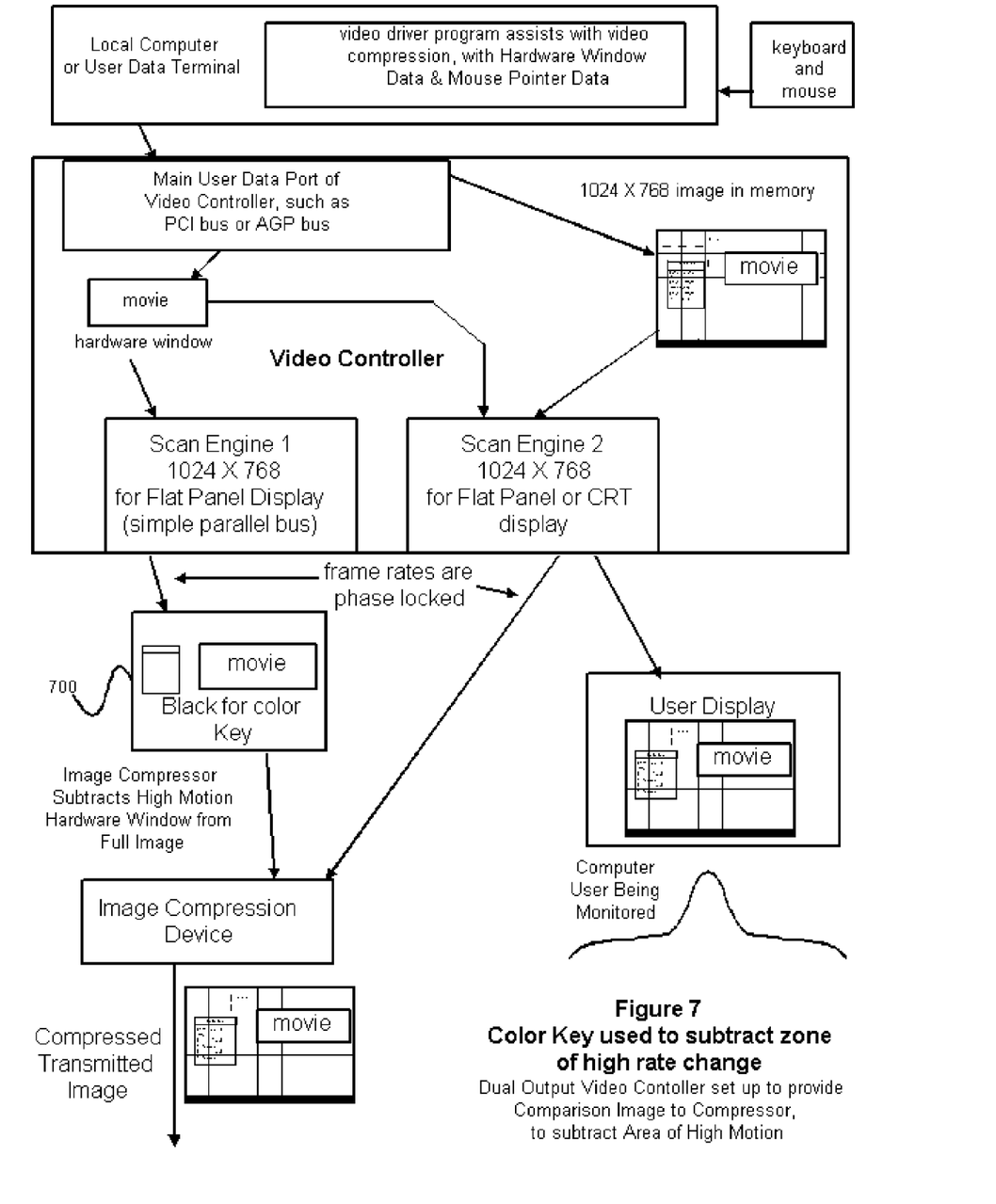
FIG. 7 Color Key used to subtract zone of high rate change Dual Output Video Controller set up to provide Comparison Image to Compressor, to subtract Area of High Motion. This shows one scan engine of the video controller is used to generate a color key to time the blank-out of the high motion movie area of the display data flow.

Another preferred embodiment is to use a complex algorithm of a mix of common compression methods applied to the block isolated 500 (computationally considered) squares of the monitored users screen image data for examination of which portions are best suited for the run-length, Huffman encoding and MPEG (targeted at image areas such as movies). Additionally, custom video player application software can work with this software video driver and hardware circuits to use one of the two scan engines output 600 to separate out a movie playing on a small area of the screen, to assist in that it needs MPEG encoding and at a preferred higher frame rate than the rest of the users screen rather than the run-length or Huffman encoding.

Compression of video data is enhanced and cost reduced by using the video functions of the video controller chip such as double buffering to a scan engine, stretch blitting (block line image transfer function) and multiple scan engines running in phase lock thus image subtraction (pixel comparison of old and new frames) can occur. Also that a scan engine can display an image that can act as a color key 700 to separate image data to enhance the complex process of compressing mixed screens of low resolution/high change rate data and high resolution-low change rate text data. This complex automated (repeats frame after frame) process of mixes of classic compression methods with the aid of the display controller is nic-named "MGAC2"="McGowan Graphic adapter Compression level 2", whereas long term (1 minute to 10 minutes) study of the screen data is done in smaller and smaller block areas, to zero in on that portion that most needs MPEG compression, thus the rest of the screen area being served with a combination of run-length and Huffman encoding Another preferred embodiment is to run the second scan engine in the video controller at ½, or ¼ or ¹⁄₁₀ normal screen refresh rate 200, 304, 400 as to provide the data flow to the compression circuits at a slower rate than seen on the monitored user's screen, thus reducing work load on the compression circuits and the Ethernet bandwidth load.

Figure 8:
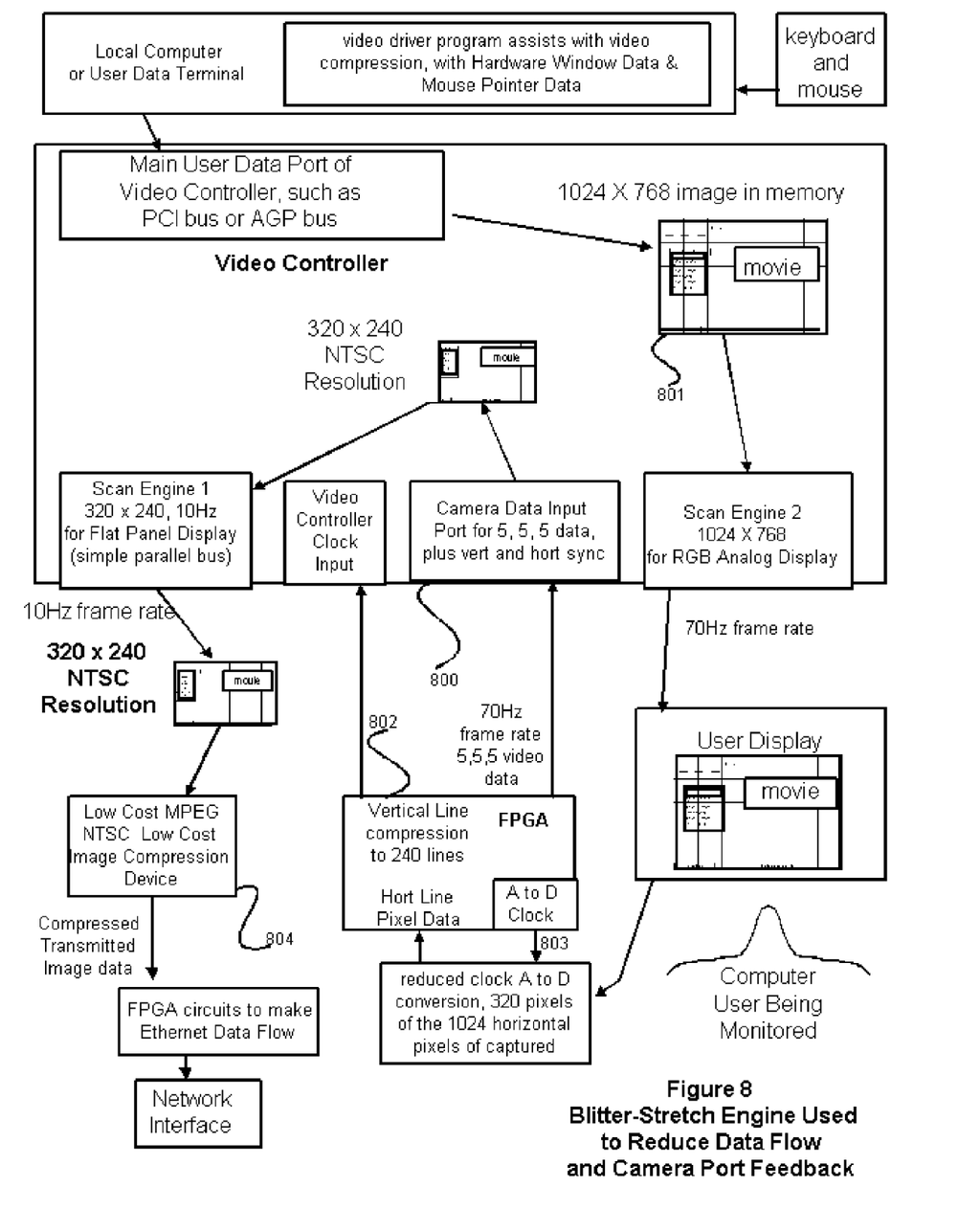
FIG. 8 Blitter-Stretch Engine Used to Reduce Data Flow and Camera Port Feedback to ease compression task.
Figure 9:
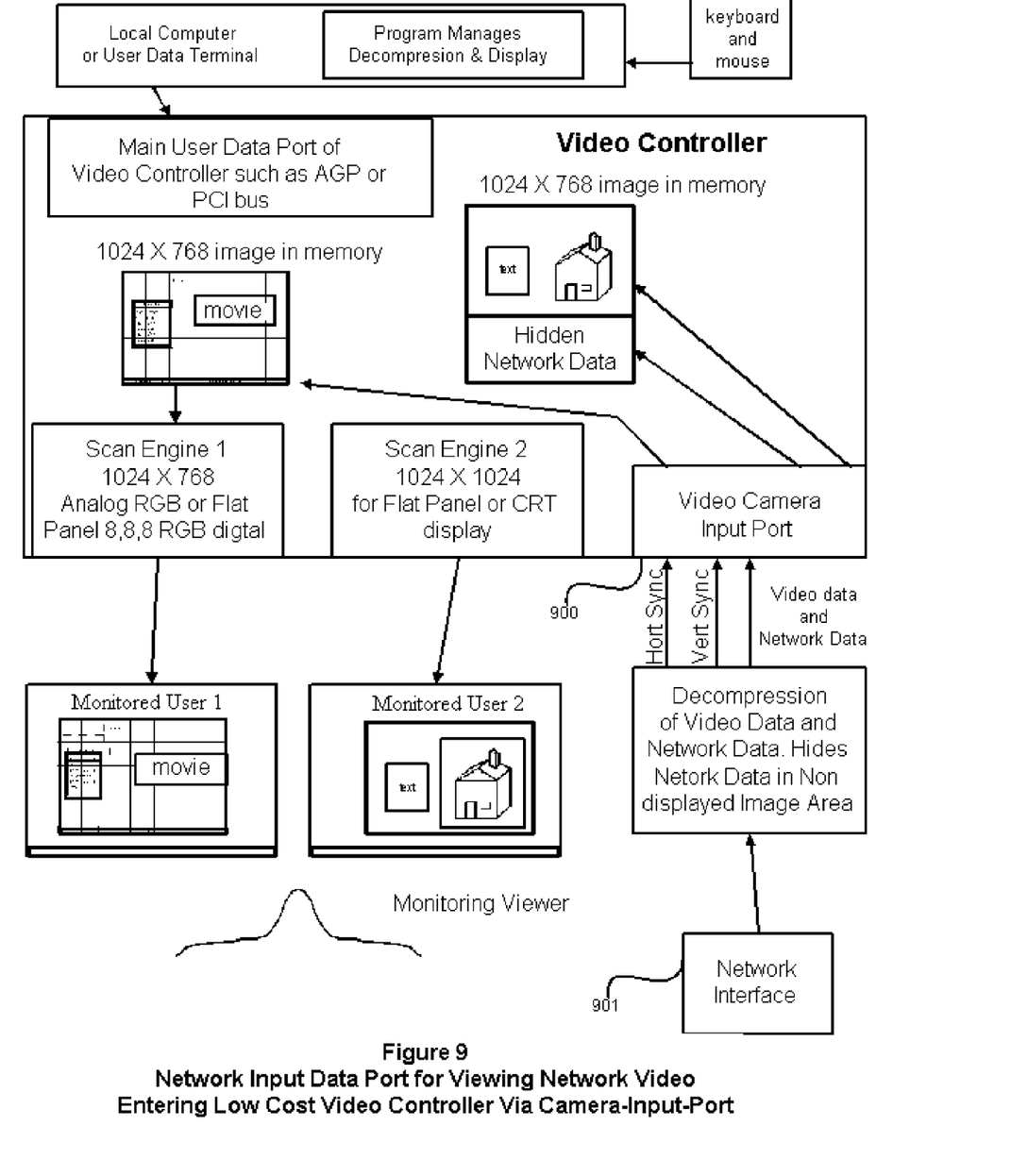
FIG. 9 Network Input Data Port for Viewing Network Video Entering Low Cost Video Controller Via Camera-Input-Port shows a novel method for reducing computational load on viewing station computer.

Another preferred embodiment is the novel use of the video camera input port 800 to feedback the analog RGB 1024 by 768 video output the viewer 801 (the monitored user) is seeing, after analog to digital conversion on a integrated circuit external of the dual output video controller IC. RGB analog video is used in this case as many low cost video controller IC's intended for the laptop personal computer market have a single 24 bit wide 8, 8, 8 RGB data flow output from one scan engine (scan engine number two) and a RGB analog video data flow from the other scan engine (scan engine number one).

The analog RGB image that the viewer (the monitored user) is seeing, contains 100% of all image data. That is, it has any and all hardware windows in it and mouse pointer.

The analog to digital conversion of scan engine number two does not do unexpected harm to the image quality, as a 5,5,5 RGB bit depth is the desired output of the analog to digital conversion. The analog to digital converter is clocked with a pixel clock that is a divided down pixel clock of the 1024 by 768 viewer's image (the monitored user). The pixel clock 803 used for the A to D conversion during horizontal scan line data flow division, is a divide by 3, except that when the 16$^{th}$ divide by 3 is reached, a divide by 4 occurs, than this pattern is repeated across the horizontal line. This clock divide scheme provides a simple and natural horizontal compression of 1024 pixels to 320 pixels.

That data flow from the analog to digital conversion now represents the viewer's image (the monitored user) horizontally compressed, is now vertically compressed from 768 pixels to 240 pixels in the FPGA 802. An optional line buffer in the FPGA will improve quality of the vertical compression. This final data flow of the viewer's image, both horizontally and vertically compressed to 320×240 is now fed into the camera input port 800.

Scan engine number one now scans at 10 Hz, which is more appropriate to the whole scheme of monitoring users, and reducing data flow to the Ethernet network. A low cost off-the-shelf MPEG converter is used to convert the NTSC sized (but speed reduced) data flow for prior to network data packet preparation. Key to this embodiment is that the scan engine number one and the video memory of the video controller is used for the frame rate reduction rather than a more costly additional frame buffer, external of the video controller IC.

What is claimed is:

1. A method, comprising:
segregating changed image pixels from a primary data stream and a secondary data stream for use in video data compression, the segregating including:
outputting the primary data stream and the secondary data stream from a dual head video controller's two phase locked video stream outputs from a primary scan engine and a secondary scan engine, respectively, such that the primary data stream from the primary scan engine is output as a current frame and the secondary data stream from the secondary scan engine is output as an old frame, the outputting including;
storing the current frame, with a delay, in a memory of the secondary scan engine in the video controller via a zoom video input port, the delay of sufficient duration to prevent the current frame stored via the zoom video input port in the memory of the secondary scan engine from overwriting the old frame output from the memory of the secondary scan engine; and
outputting the secondary data stream, as the old frame, from the memory of the secondary scan engine one frame time later than a time frame of the current frame;
comparing the phase locked primary and secondary data streams in real-time in an FPGA, to segregate any of the changed image pixels from the primary data stream and the secondary data stream; and
using an on-board general purpose micro processor in the dual head video controller in conjunction with the FPGA to count vertical syncs to thus create a local software interrupt event and updating start address registers in the primary and secondary scan engines and a write-start address register in the zoom input port to step through a series of start memory locations in a round-robin fashion to create up to 16 separate image data flows.

2. A system, comprising:
a video graphics adapter compression device structured to provide a compressed video data stream for viewing video, the video graphics adapter compression device configured to perform the following:
use a dual head video controller's two phase locked video stream outputs, a primary data stream and a secondary data stream, such that the primary data stream from a primary scan engine is output as a current frame and the secondary data stream from a secondary scan engine is output as an old frame;
store the current frame, with a delay, in a memory of the secondary scan engine in the video controller via a zoom video input port, the delay of sufficient duration to prevent the current frame stored via the zoom video input port in the memory of the secondary scan engine from overwriting the old frame output from the memory of the secondary scan engine;
output the secondary data stream from the memory of the secondary scan engine, the secondary data stream, being output as the old frame, one frame time later than a time frame of the current frame;
compare the phase locked primary and secondary data streams in real-time in an FPGA, the FPGA segregating any changed image pixels from the primary data stream and the secondary data stream for use in video data compression; and
an on-board general purpose micro processor in the dual head video controller is structured to work in conjunction with the FPGA to count vertical syncs to create a local software interrupt event to then update start address registers in the primary and secondary scan engines and a write-start address register in the zoom input port to step through a series of start memory locations in a round-robin fashion to create up to 16 separate image data flows from the video graphics adapter compression device.

* * * * *